Figure 1:
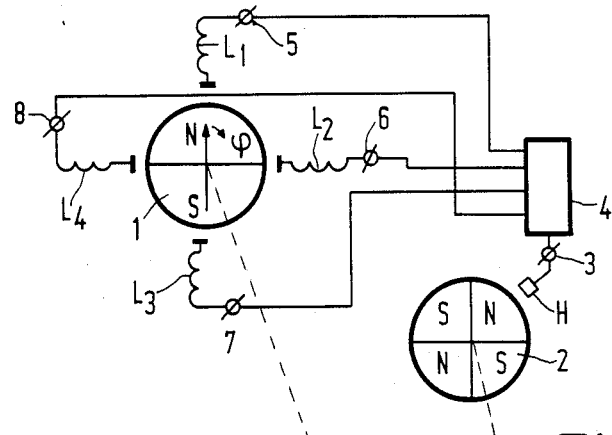

United States Patent [19]

Van Hout

[11] Patent Number: 4,814,676
[45] Date of Patent: Mar. 21, 1989

[54] SELF-STARTING BRUSHLESS D.C. MOTOR

[75] Inventor: Henricus M. Van Hout, Eindhoven, Netherlands

[73] Assignee: U.S. Philips Corporation, Tarrytown, N.Y.

[21] Appl. No.: 787,004

[22] Filed: Oct. 10, 1985

Related U.S. Application Data

[63] Continuation of Ser. No. 722,989, Apr. 15, 1985, abandoned, which is a continuation of Ser. No. 407,237, Aug. 11, 1982, abandoned.

[30] Foreign Application Priority Data

Aug. 17, 1981 [NL] Netherlands ......................... 8103835

[51] Int. Cl.[4] ............................................. H02K 29/00
[52] U.S. Cl. ..................................... 318/254; 318/138
[58] Field of Search ................... 318/254, 254 A, 138, 318/439, 316, 396, 62, 277, 278; 310/113

[56] References Cited

U.S. PATENT DOCUMENTS

| | | | |
|---|---|---|---|
| 3,663,877 | 5/1972 | Clark | 318/254 A |
| 3,760,392 | 9/1973 | Stich | 318/254 X |
| 3,946,292 | 3/1976 | Tanikoshi | 318/254 A |
| 4,047,084 | 9/1977 | Ban | 318/254 A |
| 4,065,706 | 12/1977 | Gosling | 318/254 |
| 4,167,691 | 9/1979 | Sorenson | 318/254 X |
| 4,302,692 | 11/1981 | Matsumoto | 310/113 |

FOREIGN PATENT DOCUMENTS 3018957 11/1981 Fed. Rep. of Germany ...... 318/277
0136195 10/1981 Japan ................................... 318/254

Primary Examiner—Benjamin Dobeck
Attorney, Agent, or Firm—Bernard Franzblau

[57] ABSTRACT

A brushless DC motor is self-starting using only one magneto-sensitive element because the motor is of a two-phase type and is provided with a detection device which detects towards which of the two phases the rotor is mainly directed. A presetting circuit compares the detected rotor position with the state of an energizing circuit in order to set this circuit so that the energizing circuit energizes the stator phases for said specific rotor position in such a way that starting of the motor is guaranteed, although initially with an undefined direction of rotation. By presetting the commutating direction of the energizing circuit the rotor subsequently locks onto the field and rotates in the correct direction if it has started in the incorrect direction.

18 Claims, 3 Drawing Sheets

SELF-STARTING BRUSHLESS D.C. MOTOR

This is a continuation of application Ser. No. 722,989, filed Apr. 15, 1985, now abandoned, which is a continuation of Ser. No. 407,237, filed Aug. 11, 1982, now abandoned.

The invention relates to a self-starting brushless d.c. motor comprising a stator, a rotor and a commutating device. In brushless motors commutation is effected electronically. Rotor-position information can then be obtained by means of detectors, such as Hall elements. For polyphase motors satisfactory commutation and starting characteristics are obtained by the use of one detector per phase, which detectors are circumferentially spaced in conformity with the number of phases of the motor. The disadvantage of this is that such motors are comparatively expensive. Therefore, the aim is to use only one detector. Single-phase motors obviously employ one detector. However, these motors have the inherent disadvantage that the direction of rotation is undefined. Moreover, the starting situation may be such that, upon energization, the rotor is in a stable position, which problem may also occur in polyphase motors. The two problems can be overcome by mechanical means, such as the provision of a "detent position", for example by ensuring by means of an auxiliary magnet that the motor stops in a position in which starting is possible in a predetermined direction. However, the drawback of mechanical and/or magnetic means is that such means also adversely affect the steady-state behavior of the motor. In order to permit the use of only one detector in polyphase motors, specifically three-phase motors, it has therefore been proposed to start the motor by means of a rotating auxiliary field. This has the disadvantage that, during starting, the motor is not self-commutating and consequently exhibits unfavorable starting characteristics.

The invention aims at providing a brushless motor which is self-commutating during starting, thereby enabling it to be started by purely electronic means.

To this end the invention is characterized in that the stator is of a two-phase type and that the commutating device comprises a detection device having only one detector for distinguishing towards which of the two stator phases the rotor is mainly directed, a presettable energizing circuit for the commutated energization of the stator phases, and a presetting circuit adapted to be controlled by the detection device for, at least when the rotor is stationary, setting the energizing circuit to that one of the two states which corespond to energization of the stator phase other than that towards which the rotor is mainly directed.

This combination of characteristic features results in a motor which comprises only one detector, which is self-commutating during starting, and which does not require any non-electronic starting means.

The invention is based on the insight that, although in a polyphase motor the rotor position cannot be detected unambiguously by means of only one detector, in a two-phase motor the two rotor positions that cannot be distinguished by means of one detector always correspond to one specific stator phase, so that self-commutating starting is possible using only one detector.

A motor in accordance with the invention, which comprises p pole-pairs, may further be characterized in that the detection device comprises a permanent-magnetic member having 2p pole-pairs, which member is rotatable in synchronism with the rotor, and in that the detector comprises a magneto-sensitive element, specifically a Hall element.

This embodiment may further be characterized in that the presetting circuit comprises a polarity detector for detecting the polarity of the magnetic field sensed by the magneto-sensitive element and a gate circuit for comparing the detected polarity with the state of the energizing circuit.

The undefined starting direction of some motors in accordance with the invention is not a problem for some uses. If a specific direction of rotation is required, an additional advantage of a solution in accordance with the invention will become apparent: in the motor in accordance with the invention the correct direction of rotation can be guaranteed in a simple manner. For this purpose a preferred embodiment of the invention may further be characterized in that the presettable energizing circuit is preset to the switching sequence corresponding to the desired direction of rotation of the rotor and can be switched, in accordance with a cyclic permutation, under command of commutation signals, regardless of the actual direction of rotation of the rotor. This further characteristic feature is based on the insight that when the motor is started, commutating pulses are generated as a result of the self-commutating starting behavior of the motor in accordance with the invention. By electronically laying down the switching sequence of the motor phases it is achieved that the phases are consecutively energized in the correct sense, even in the case of an incorrect starting direction. In the case of such an incorrect starting direction, the rotating stator field and the rotor which rotates in the opposite sense "meet" each other and the rotor locks in after a maximum of two commutations. In the case of a p-pole motor the maximum rotation in the incorrect direction is equal to substantially $360°/p$. For many uses, such as motors in cassette recorders, such an incorrect starting motion presents no problem at all. It may then be advantageous for the presettable energizing circuit to have a control input and be adapted to preset the switching sequence to one of the two possible directions as a function of a signal on said control input in order to render the direction of rotation of the motor reversible.

This preferred embodiment may further be characterized in that the detection device comprises a permanent-magnetic member having 2p pole-pairs, which member is rotatable in synchronism with the rotor, in that the detector comprises a magneto-sensitive element, specifically a Hall element, and in that there is provided a commutating-signal generator for generating commutating signals for the energizing circuit in synchronism with the magnetic-field polarity changes detected by the detector.

A first version of said preferred embodiment may be characterized in that the presetting circuit comprises a polarity detector for detecting the polarity of the magnetic field sensed by the magneto-sensitive element and a first gate circuit for comparing the detected polarity with the state of the energizing circuit.

A further characteristic feature is that then the comparator circuit is adapted to supply additional commutating signals to the energizing circuit. In this first version of the preferred embodiment of the invention an incorrect rotor position is corrected by supplying an additional commutating pulse.

A second alternative version of the preferred embodiment of the invention may be characterized in that the commutating-signal generator comprises a polarity detector for detecting the polarity of the magnetic field sensed by the magneto-sensitive element and a gate circuit for comparing the detected polarity with the state of the energizing circuit and generating a commutating signal if said state does not correspond to the detected polarity. In this version the commutating signal is supplied by the presetting circuit. This version is based on the insight that each commutation is in fact preceded by an "incorrect" energizing condition. Indeed, the output signal of the position detector changes, at the commutation instant, while the energizing condition of the stator changes only shortly afterwards. This means that the rotor position and the energizing condition briefly do not correspond to each other, which non-correspondence can be signalled by the presetting circuit. In the present version this is utilized by having the presetting circuit generate the commutating pulses in the case of these apparently incorrect rotor positions, so that a separate commutating-pulse generator may be dispensed with.

In said first and second version the detected rotor position is compared with the energizing condition at the instant of starting. However, regardless of the energizing condition which would occur upon starting of the motor, it is alternatively possible to set the energizing circuit to one of the two possible correct states depending on the detected rotor position during build-up of the supply voltage. For this purpose a third version of the preferred embodiment of the invention is characterized in that there are provided means for detecting the application of a supply voltage, in that the presetting circuit comprises a polarity detector for detecting the polarity of the magnetic field sensed by the magneto-sensitive element, and a first gate circuit for comparing the detected polarity with the state of the energizing circuit and, after detection of the application of a supply voltage, setting the energizing circuit to a state which is in conformity with the detected polarity.

In this third version these steps also ensure correct starting. Since the commutation may be disturbed by spurious pulses and this is not readily corrected as in the first and second versions, it is advantageous if appropriate steps are taken in this third version. A suitable solution is then characterized in that there is provided a second gate circuit for suppressing the next commutating signal under command of the comparator circuit.

By suppressing the next commutating pulse instead of generating an additional commutating pulse it is achieved that the commutation is corrected immediately. Indeed a spurious impulse will practically always give rise to an additional commutation instead of suppressing a commutation, so that it is more favorable to suppress a commutating pulse than to generate an additional pulse.

It is advantageous if the energizing circuit of the motor in accordance with the invention comprises a shift register. A further characteristic feature is that the shift register has an adjustable shifting direction. Thus, the direction of rotation of the motor can be selected in a simple manner. With respect to its construction, the motor in accordance with the invention may further be characterized by a rotor having a cylindrical permanent magnet which is magnetized to have substantially 2p-poles, a stator having two-phase windings, arranged coaxially with the rotor inside the cylindrical permanent magnet, a wiring support secured to the stator, to which support the stator windings are connected, and a substrate arranged on the wiring support, on which substrate at least the magneto-sensitive element is arranged in such a way that said element is disposed within the magnetic range of influence of the end face of the cylindrical permanent magnet which faces said support, the permanent magnet being provided with a 4p-pole magnetization at the location of said end face.

Figure 2:
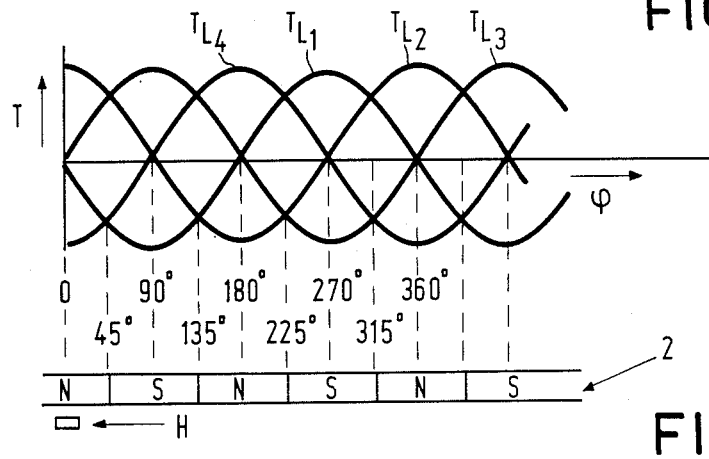
Figure 3:
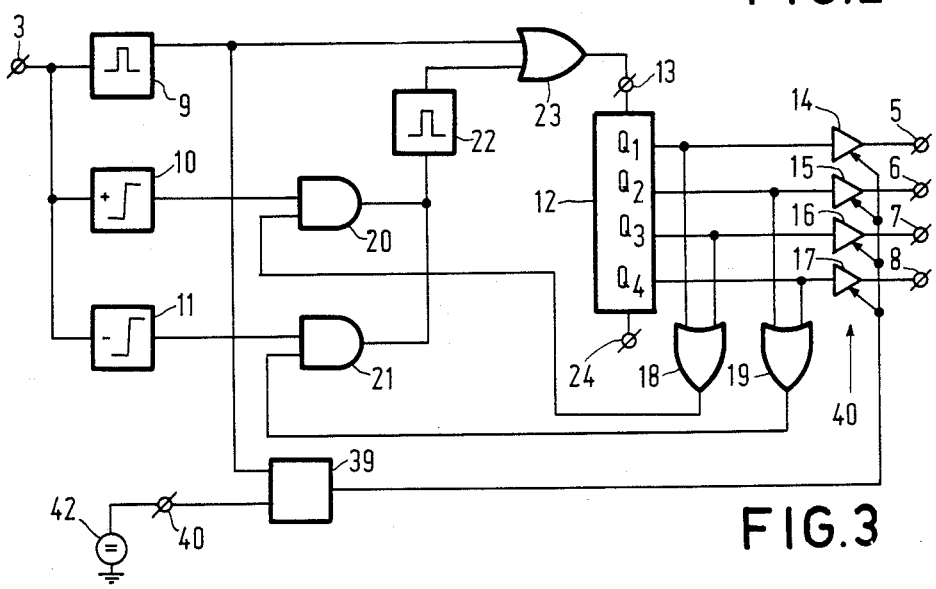
Figure 4:
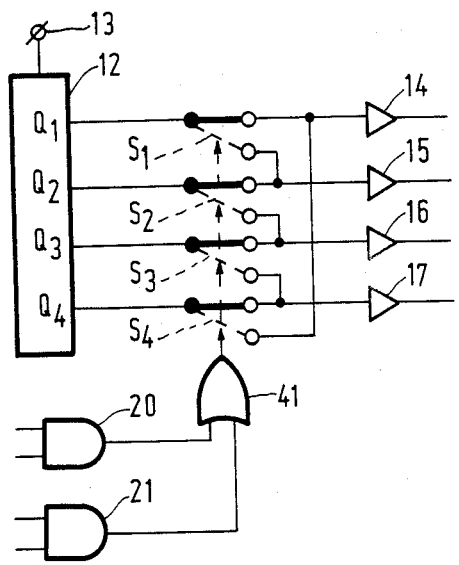
Figure 5:
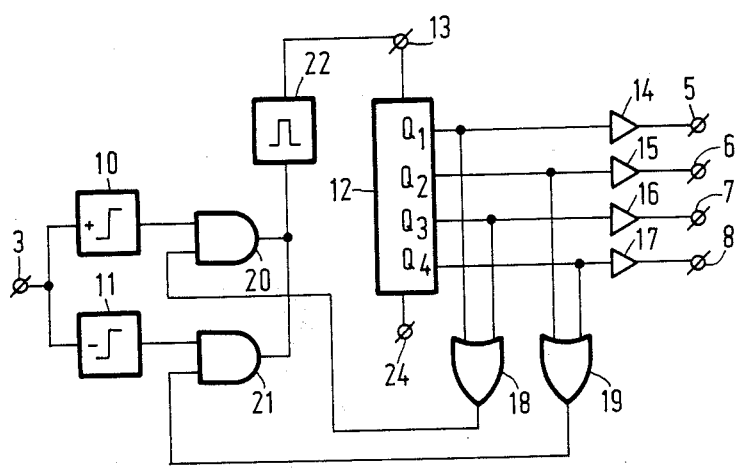
Figure 6:
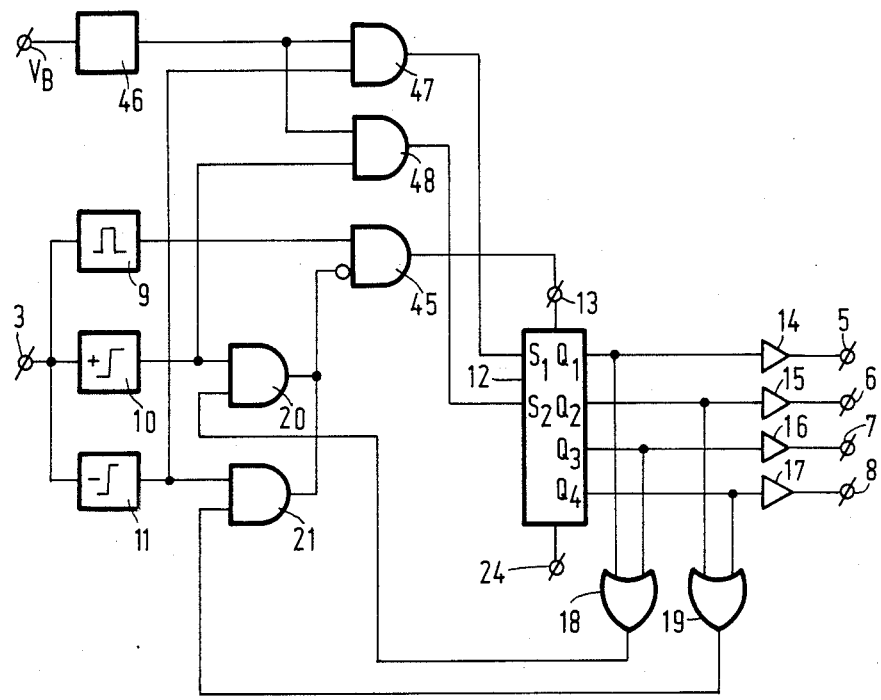
Figure 7:
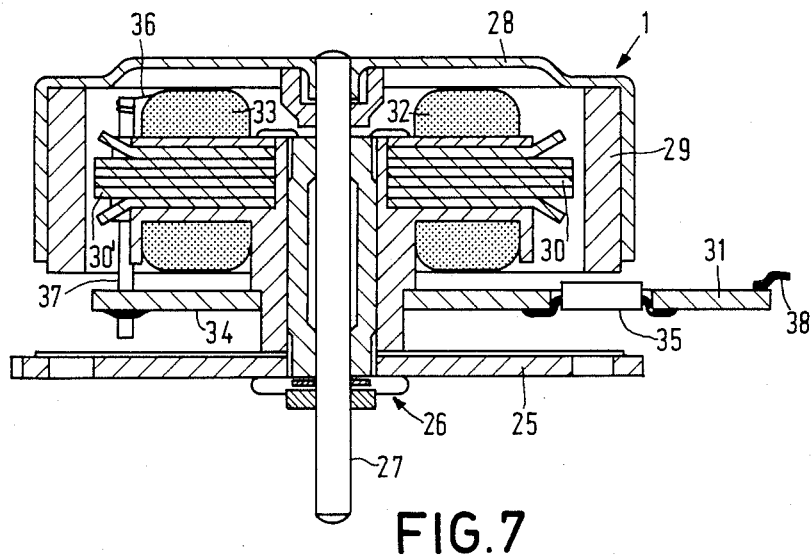

The invention will now be described in more detail with reference to the drawings, in which:

FIG. 1 schematically represents the principle of the motor in accordance with the invention, FIG. 2 is a diagram to explain the operation of the motor of FIG. 1, FIG. 3 shows a first version of the circuit 4 in the motor of FIG. 1, FIG. 4 shows an alternative to a part of the circuit of FIG. 3, FIG. 5 shows a second version of said circuit 4, FIG. 6 shows a third version of said circuit 4, and FIG. 7 is a sectional view of a preferred embodiment of the invention.

FIG. 1 schematically represents a motor with an energizing circuit in accordance with the invention. The motor has a rotor 1, which in the present example is magnetized to have two poles (N, S). The rotor position is specified by an angle $\phi$, which in the condition shown is zero. The stator comprises four coils $L_1$, $L_2$, $L_3$ and $L_4$ with connections 5, 6, 7 and 8 respectively. A position encoder 2, which is magnetized to have four poles, is mechanically coupled to—or arranged on—the rotor 1. A field sensor H, specifically a Hall element, is in magnetic contact with said position encoder 2. The position of the position encoder 2 and sensor H relative to the rotor position is such that the sensor H detects polarity changes via the position encoder 2 at those rotor positions $\phi$ where commutation of the energization of the stator coils $L_1$, $L_2$, $L_3$ and $L_4$ is most appropriate, that is, approximately at the positions $\phi=45°$, 135°, 225° and 315°. The output signal of the field sensor H is applied to an input 3 of an energizing circuit 4, which energizing circuit 4 in turn energizes each of the stator coils $L_1$, $L_2$, $L_3$ and $L_4$.

FIG. 2 shows the variation $T_{L1}$, $T_{L2}$, $T_{L3}$ and $T_{L4}$ of the torque T exerted on the rotor 1 as a function of the rotor position $\phi$ upon energization of the coils $L_1$, $L_2$, $L_3$ and $L_4$ respectively, and the field (N, S) of the position encoder 2 sensed by the field sensor H as a function of said rotor position $\phi$.

If upon starting of the motor—after application of a supply voltage or after blocking of the rotor—a specific coil is energized, the rotor will or will not begin to revolve depending on the instantaneous position $\phi$. If, for example, coil $L_4$ is energized, the diagram of FIG. 2 shows that the torque exerted on the rotor is zero at $\phi=270°$. An unstable position of equilibrium for which $T=0$ is found at $\phi=90°$, in which position the motor will not start in the loaded condition. For rotor positions $\phi$ between 270° and 315° and those between 225° and 270° the rotor will be drawn towards the position of equilibrium $\phi=270°$. Outside this range of 225°-315° the rotor will also be attracted towards $\phi=270°$, but commutation is effected at the appropriate instant when at $\phi=225°$ or $\phi=315°$ the field sensor H senses a field change via the position encoder 2.

When the rotor positions for which energization of the stator coil $L_4$ gives rise to starting problems are compared with the positions of the position encoder 2 coupled thereto, it is found that starting is problematic when the field sensor H senses an S-magnetization of the position encoder 2. A similar comparison carried out for energization of the stator coils $L_1$, $L_2$ and $L_3$ shows that when the field sensor H senses an S-magnetization starting is problematic upon energization of coil $L_2$ or $L_4$ and that when the field sensor H senses an N-magnetization starting is problematic when coil $L_1$ or $L_3$ is energized. In accordance with the invention starting can be guaranteed by constructing the energizing circuit 4 so that the said combinations of energization of one of the coils $L_1$ to $L_4$ and the polarity of the field from the position encoder 2 sensed by the field sensor H for which starting gives rise to problems are excluded. The motor will then always start, though with an undefined direction of rotation.

A specific direction of rotation can be obtained by designing the energizing circuit 4 so that the energizing sequence of the coils $L_1$ to $L_4$ is fixed, for example the sequence $L_1$, $L_2$, $L_3$, $L_4$ for clockwise rotation, switching to the next coil in said sequence being effected under command of the field sensor H. Thus, after starting a rotating field is obtained in a specified direction, regardless of the starting direction of the rotor 1, so that upon starting of the rotor in the incorrect direction the rotor position will be in conformity with the energization and the rotor locks in to the rotating field and begins to rotate in the correct direction after half a revolution at most. If, for example, coil $L_4$ in the configuration shown in FIG. 1 is energized when the position of the rotor 1 is as shown, the energizing circuit 4 being set to provide clockwise energization, the rotor 1 will begin to revolve in the anticlockwise direction. At $\phi=-45°$ commutation is effected under command of the sensor H and coil $L_1$ is energized, so that the rotor motion is braked and the direction is reversed. The rotor then continues to the position $\phi=-45°$, at which instant coil $L_2$ is energized and the rotor locks in to the clockwise rotating field. The maximum rotation in the incorrect direction is less than 180°, namely the rotation from $\phi<+45°$ to $\phi>-135°$. For many uses such as in cassette recorders this incorrect rotation upon starting presents no problem.

FIG. 3 shows an example of the energizing circuit 4 (see FIG. 1), which together with the field sensor H may be incorporated into one integrated circuit. The circuit comprises a circuit 12 which is cyclically switched under command of a pulse on an input 13, for example a 4-bit shift register which is coupled end-around and in which one logic "one" and three logic "zeros" are stored. Thus, one of the four outputs $Q_1$ to $Q_4$ of the circuit 12 is always energized differently. The four outputs $Q_1$ to $Q_4$ are connected to the terminals 5 to 8 of the coils $L_1$ to $L_4$, as the case may be via buffer amplifiers 14 to 17, so that always one of the coils $L_1$ to $L_4$ is energized. The shift register 12 has a fixed shifting direction, which is for example optionally presettable by the application of one of two possible logic levels to an input 24. This ensures that the coils $L_1$ to $L_4$ are energized in a predetermined sequence. By making the shifting direction of the shift register 12 adjustable it is possible to select the direction of rotation of the motor by applying the logic level which corresponds to the desired direction of rotation to the input 24.

The shift register 12 is advanced under control of pulses on input 13. In order to synchronize this shifting with the rotor motion the signal supplied by the field sensor H is applied to a pulse shaper 9 via input 3, which pulse shaper produces a pulse on input 13 upon the occurrence of each field transition which is detected, that is at the desired commutation instants when the rotor position $\phi$ is 45°, 135°, 225° or 315°, so that self-commutating operation of the motor is possible.

In order to prevent the stator coils from being energized in such a way that the motor does not start, the polarity of the field sensed by the field sensor H is compared with the position of the shift register 12, as has been explained with reference to FIG. 2. For this purpose the signal from the field sensor H is applied, via input 3, to a detector 10 which detects a signal corresponding to N-magnetization, and to a detector 11 which detects a signal corresponding to S-magnetization. Whether coil $L_1$ or coil $L_3$ is energized is detected by means of an OR-gate 18 connected to outputs $Q_1$ and $Q_3$ and whether coil $L_2$ or coil $L_4$ is energized is detected by means of an OR-gate 19 connected to outputs $Q_2$ and $Q_4$. The output signals of the detector 10 and OR-gate 18 are applied to an AND-gate 20 and the signals from detector 11 and OR-gate 19 are applied to an AND-gate 21. The output signals of the AND-gates 20 and 21 are combined, for example by means of an OR-gate or, as is shown in FIG. 3, by interconnecting the outputs ("wired-or"). This combined output signal is an indication of an impermissible energizing condition, that is a condition in which the energization can keep the rotor in a position in which the torque T=0, so that the motor does not start. A method of eliminating the impermissible energizing condition is then, for example, to set the shift register 12 to a position corresponding to a permissible condition, which in the example of FIG. 3 is achieved by advancing the shift register 12 by one additional position. For this purpose the combined output signal of the AND-gates 20 and 21 is applied to a pulse shaper 22 which, upon the occurrence of such an impermissible condition, supplies a pulse which is added to the output signal of the pulse shaper 9 by means of an OR-gate 23, so that an additional shifting pulse appears on input 13 of the shift register 12.

An alternative to this method is obtained by for example, removing the pulse shaper 22 (and OR gate 23) from the circuit of FIG. 3 and by completing the remainder with the circuit section shown in FIG. 4. The outputs $Q_1$, $Q_2$, $Q_3$ and $Q_4$ of the shift register 12 are then connected to switches $S_1$, $S_2$, $S_3$ and $S_4$ respectively, which switches may be formed by means of logic gates. In the positions of the switches $S_1$ to $S_4$ shown, the situation is then as shown in FIG. 3, while in the other positions of said switches (the positions shown dotted) the outputs $Q_1$, $Q_2$, $Q_3$ and $Q_4$ are connected to the buffer amplifiers 15 16, 17 and 14, respectively, so that the energizing condition is shifted by one position in the specified direction. The switches $S_1$ to $S_4$ are controlled by the output signals of AND-gates 20 and 21, which signals are combined by means of the OR-gate 41.

In the circuit arrangement of FIG. 3 steps must be taken to prevent an undesired pulse from being formed by the pulse shaper 22 as a result of the non-simultaneous change-over of the shift register 12 and the detectors 10 and 11. This is for example possible by the use of clocked logic. Another possibility is to utilize this situation by removing the pulse shaper 9 and the OR-gate 23 from the circuit of FIG. 3 and connecting the pulse shaper 22 to the input 13 of the shift register 12, which alternative is shown in FIG. 5. The circuit then operates in the same way as regards undesired rotor positions. As regards the commutation the circuit then operates in that at the instant that the polarity of the signal on input 3 changes the shift register remains in the same state. This is detected by AND-gate 20 or 21 in the same way as is an incorrect position of the shift register and a pulse is applied to input 13 of the shift register 12 by pulse shaper 22.

In the circuit arrangement and the alternatives described in the foregoing an additional pulse which advances the shift register 12 by one position is applied to the shift register each time that a spurious pulse appears. Since spurious pulses are generally additional pulses and do not suppress a desired pulse, this results in the shift register 12 being advanced by two steps in total, which temporarily gives rise to the same situation as described in the case of starting in the wrong direction. This may not be a problem if the risk of spurious pulses occurring is minimized, for example by electronic means—such as generating time windows for blocking pulses during time intervals in which no commutating pulse can occur. However, in cases in which such a situation must be precluded, the circuit arrangement of FIG. 3 may be modified to suppress the next pulse supplied by the pulse shaper 9, instead of generating an additional pulse, under command of the AND-gates 20 and 21, which modification is shown in FIG. 6.

In comparison with the version of FIG. 3 the OR-gate 23 has been replaced by an AND-gate 45 having an inverting input which is driven by the output signal of the AND-gates 20 and 21. However, this method fails during starting when the motor is still stationary. If the initial energizing condition is a condition in which the rotor is in a stable position, the pulse shaper 9 initially does not supply a pulse, so that said pulse cannot be suppressed. A solution to this is to set the shift register to a position which corresponds to a desired position under control of the detectors 10 and 11 during the build-up of the supply voltage. If during the build-up of the supply voltage the detecter 10 is activated, the shift register 12 should be set so that output $Q_2$ or $Q_4$ goes high whereas if the detector 11 is activated the shift register 12 should be set so that output $Q_1$ or $Q_3$ goes high.

In comparison with the circuit of FIG. 3, the circuit of FIG. 6 therefore also comprises a supply-voltage detector 46, which supplies a pulse at the instant that the supply voltage appears on terminal $V_B$. This pulse is compared with the output signals of the detectors 10 and 11 by AND-gates 47 and 48 respectively. The output signals of the gates 47 and 48 are applied to respective set inputs $S_1$ and $S_2$ of the shift register to energize output $Q_1$ or $Q_2$ respectively. This ensures that, when the detector 10 is actuated during application of the supply voltage, the shift register is set so that output 6 is energized and, when the detector 11 is actuated, so that output 5 is energized.

The circuit of FIG. 3—in so far as already described - as well as other versions may be provided with a useful extension, especially when these circuits are integrated. This extension utilizes the fact that the signal generated by the field sensor H can also be used as a tachosignal. For this purpose said signal or, as is shown in FIG. 3, the output signal of pulse shaper 9 may be applied to a control circuit 39 to which a control signal can be applied via an input 40. Especially in the case of speed control the frequency of the pulses supplied by the pulse shaper 9 can be determined in the circuit 39 using, for example, a frequency-voltage converter and may be compared with a d.c. control signal which is, for example, supplied by a reference source 42 incorporated in the same integrated circuit. In particular in the case of phase control the phase of the pulse train supplied by the pulse shaper 9 may be compared with a reference-pulse train applied to input 40. Other servo-control circuits are also possible. The output signal of the servo-control circuit 39 can influence the speed and/or phase of the motor, for example by controlling the magnitude of the drive, for example by control of the amplitude of the output signals of the buffer amplifiers 14 to 17 by the control circuit 39, which is represented symbolically by arrows 40 in FIG. 3, or for example by the use of pulse-width control.

FIG. 7 shows an example of a motor in accordance with the invention in axial cross-section. Said motor comprises a mounting plate 25, which may for example form part of an enclosure. The rotor shaft 27 is secured to the plate 25 via a bearing arrangement 26. The rotor 1 is cup-shaped and comprises a magnetically conductive cup 28 which is provided with a cylindrical permanent magnet 29 on the inside of its cylindrical portion. The stator is secured to said bottom plate 25 inside said cup and magnet 28, 29 and comprises a lamination assembly (30, 30') forming poles, and coils (32, 33). A printed circuit board 34 in which pins, such as the pin 37 shown in the present cross-sectin, are mounted is secured to the stator. The stator coils are connected to these pins (connection 36). The printed circuit board also accommodates an integrated circuit 35, which comprises a substrate supporting the energizing circuit 4 and the field sensor H (in the present case a Hall element).

In order to arrange said Hall element as near as possible to the rotor magnet 29 the integrated circuit 35 is arranged in an opening in the p.c.board 34. A projecting part 31 of said printed circuit board comprises connection facilities for the supply voltage and, as the case may be, an input 24 (for adjusting the direction of rotation) and/or 40 (for adjusting the speed) (see FIG. 3). The magnet 29 is radially magnetized. The position encoder 2 is formed by providing the side of the permanent magnet 29 which faces the printed circuit board 34 with locally different magnetizations, which does not significantly influence the motor operation while the main field of magnet 29 does not perceptibly influence the output signal of the Hall element. In a particular example the motor comprised 6 poles and the position encoder consequently 12 poles.

In general the invention may be used in a two-phase motor having p pole-pairs and a position encoder with 2p pole-pairs. It is to be noted that a motor as is shown schematically in FIG. 1 is sometimes referred to as a four-phase motor, the motor being a two-phase motor when the coils $L_1$ and $L_3$ as well as the coils $L_2$ and $L_4$ are connected in series. Each of the two series arrangements can then be energized in both senses. In this application the term applied "two-phase" relates to both types of motor. Furthermore it will be appreciated that a permanent-magnetic rotor is not essential.

What is claimed is:

1. A self-starting brushless d.c. motor comprising a stator, a rotor and a commutating device, characterized in that the stator is of a two-phase type and that the commutating device comprises
   a detection device having only one detector for distinguishing towards which of the two stator phases the rotor is mainly directed,
   a presettable energizing circuit for the commutated energization of the stator phases, and
   a presetting circuit adapted to be controlled by the detection device for, at least when the rotor is stationary, setting the energizing circuit to one of the two states which correspond to energization of the stator phase other than that towards which the rotor is mainly directed.

2. A self-starting brushless d.c. motor as claimed in claim 1, characterized in that the presettable energizing circuit is preset to a switching sequence corresponding to a desired direction of rotation of the rotor and can be switched in accordance with a cyclic permutation, under command of commutation signals, regardless of the actual direction of rotation of the rotor.

3. A self-starting brushless d.c. motor as claimed in claim 2, characterized in that the presettable energizing circuit comprises a control input and means adapted to preset the switching sequence to either one of the two possible directions as a function of a signal on said control input in order to render the direction of rotation of the motor reversible.

4. A self-starting brushless d.c. motor as claimed in claim 1, comprising p pole pairs, characterized in that the detection device comprises a permanent-magnetic member having 2p pole pairs, said member being rotatable in synchronism with the rotor, and the detector comprises a magneto-sensitive Hall element.

5. A self-starting brushless d.c. motor as claimed in claim 4, characterized in that the presetting circuit comprises a polarity detector for detecting the polarity of the magnetic field sensed by the magneto-sensitive element and a gate circuit for comparing the detected polarity with the state of the energizing circuit.

6. A self-starting brushless d.c. motor as claimed in claim 2, comprising p pole pairs, characterized in that the detection device comprises a permanent-magnetic member having 2p pole pairs, said member being rotatable in synchronism with the rotor, the detector comprises a magneto-sensitive Hall element, and a commutating-signal generator for generating commutating signals for the energizing circuit in synchronism with magnetic-field polarity changes detected by the detector.

7. A self-starting brushless d.c. motor as claimed in claim 6, characterized in that the presetting circuit comprises a polarity detector for detecting the polarity of the magnetic field sensed by the magneto-sensitive element and a first gate circuit for comparing the detected polarity with the state of the energizing circuit.

8. A self-starting brushless d.c. motor as claimed in claim 7, characterized in that the presetting circuit is adapted to supply additional commutating signals to the energizing circuit.

9. A self-starting brushless d.c. motor as claimed in claim 6, further comprising means for detecting the application of a supply voltage, wherein the presetting circuit comprises a polarity detector for detecting the polarity of magnetic field sensed by the magneto-sensitive element, and a first gate circuit for comparing the detected polarity with the state of the energizing circuit and, after detection of the application of a supply voltage, setting the energizing circuit to a state which is in conformity with the detected polarity.

10. A self-starting brushless d.c. motor as claimed in claim 2, further comprising a second gate circuit for suppressing the next commutating signal under command of the presetting circuit.

11. A self-starting brushless d.c. motor as claimed in claim 6, characterized in that the commutating signal generator comprises a polarity detector for detecting the polarity of the magnetic field sensed by the magneto-sensitive element and a gate circuit for comparing the detected polarity with the state of the energizing circuit and generating a commutating signal each time that said state does not correspond to the detected polarity.

12. A self-starting brushless d.c. motor as claimed in claim 2, characterized in that the energizing circuit comprises a shift register.

13. A self-starting brushless d.c. motor as claimed in claim 12, characterized in that the shift register has an adjustable shifting direction.

14. A self-starting brushless d.c. motor as claimed in claim 1, characterized by
   a rotor having a cylindrical permanent magnet which is magnetized to have substantially 2p poles,
   a stator having two-phase windings, arranged coaxially with the rotor inside the cylindrical permanent magnet,
   a wiring support secured to the stator, to which support the stator windings are connected, and
   a substrate arranged on said wiring support, on which substrate at least a magneto-sensitive element is arranged in such a way that said element is disposed within magnetic range of a magnetic field of the end face of the cylindrical permanent magnet which faces said support, the permanent magnet being provided with a 4p-pole magnetization at the location of said end face.

15. A self-starting brushless d.c. motor as claimed in claim 2, characterized by
   a rotor having a cylindrical permanent magnet which is magnetized to have substantially 2 p poles,
   a stator having two-phase windings, arranged coaxially with the rotor inside the cylindrical permanent magnet,
   a wiring support secured to the stator, to which support the stator windings are connected, and
   a substrate arranged on said wiring support, on which substrate at least a magneto-sensitive element is arranged in such a way that said element is disposed within magnetic range of a magnetic field of an end face of said cylindrical permanent magnet which faces said support, said permanent magnet being provided with a 4p-pole magnetization at said end face.

16. A self-starting brushless d.c. motor as claimed in claim 6, characterized in that the energizing circuit comprises a shift register.

17. A self-starting brushless d.c. motor as claimed in claim 16, characterized in that the shift register has an adjustable shifting direction.

18. A self-starting brushless DC motor as claimed in claim 1 wherein, the detection device comprises a magnetic member rotatable in synchronism with the rotor and having at least first and second pole pairs each comprising a north (N) and a south (S) pole, the one detector comprises a magneto-sensitive element responsive to said N and S poles to produce first and second signals corresponding to said N and S poles, respectively, wherein the energizing circuit has at least first and second states in which it supplies current to first and second phase windings of the stator, respectively, and wherein the presetting circuit includes a polarity detector for deriving signals indicative of the polarity (N or S) of said signals of the magneto-sensitive element, and a logic circuit responsive to said polarity signals and to signals indicative of the state of the energizing circuit to derive further signals for changing the state of the energizing circuit to produce rotation of the motor.

* * * * *